(12) United States Patent
Kersey et al.

(10) Patent No.: US 11,177,670 B2
(45) Date of Patent: Nov. 16, 2021

(54) INTEGRATED CHARGER AND INTEGRATED CHARGER PROCESS

(71) Applicant: MarathonNorco Aerospace, Inc., Waco, TX (US)

(72) Inventors: Philip Kersey, Waco, TX (US); Graham Cook, Waco, TX (US); Jason VanDeVelde, Waco, TX (US)

(73) Assignee: MarathonNorco Aerospace, Inc., Waco, TX (US)

( * ) Notice: Subject to any disclaimer, the term of this patent is extended or adjusted under 35 U.S.C. 154(b) by 263 days.

(21) Appl. No.: 16/414,914

(22) Filed: May 17, 2019

(65) Prior Publication Data

US 2019/0356141 A1    Nov. 21, 2019

Related U.S. Application Data

(60) Provisional application No. 62/673,340, filed on May 18, 2018.

(51) Int. Cl.
*H02J 7/00* (2006.01)
*H01M 10/42* (2006.01)

(52) U.S. Cl.
CPC ......... *H02J 7/0019* (2013.01); *H01M 10/425* (2013.01); *H02J 7/00* (2013.01); *H01M 2220/20* (2013.01); *H02J 2207/30* (2020.01)

(58) Field of Classification Search
USPC .......................................................... 320/112
See application file for complete search history.

(56) References Cited

U.S. PATENT DOCUMENTS

| | | | |
|---|---|---|---|
| 7,977,922 B1* | 7/2011 | Collins | H02J 7/00711 320/141 |
| 2008/0025010 A1* | 1/2008 | Zick | H02J 7/0042 361/807 |
| 2012/0091957 A1 | 4/2012 | Masuda | |
| 2016/0126746 A1* | 5/2016 | Keeling | H02J 50/70 307/104 |
| 2016/0129794 A1* | 5/2016 | Huang | B60L 53/62 320/108 |
| 2017/0057650 A1* | 3/2017 | Walter-Robinson | B64D 41/00 |
| 2017/0302888 A1* | 10/2017 | Mehrholz | B64F 1/36 |
| 2019/0348845 A1* | 11/2019 | Kersey | H01M 10/46 |
| 2019/0356141 A1* | 11/2019 | Kersey | H02J 7/00047 |

OTHER PUBLICATIONS

International Search Report and Written Opinion issued in PCT/US2019/032829, dated Aug. 19, 2019.

* cited by examiner

*Primary Examiner* — Mohammed Alam
(74) *Attorney, Agent, or Firm* — BakerHostetler (57) ABSTRACT

An aircraft-based power system includes a charger system that includes a charger controller and a charger circuit. The charger system is further configured to connect to a ground-based power source and the charger system is further configured to deliver power from the ground-based power source to the charger circuit. The charger circuit is configured to be controlled by the charger controller and the charger controller is configured to control the charger circuit consistent with a charging protocol. The charger system is further configured to charge a battery system that includes a plurality of battery cells with the charger circuit consistent with the charging protocol.

20 Claims, 7 Drawing Sheets

INTEGRATED CHARGER AND INTEGRATED CHARGER PROCESS

CROSS REFERENCE TO PRIOR APPLICATIONS

This application claims the benefit of U.S. Provisional Application No. 62/673,340 filed on May 18, 2018, which is hereby incorporated by reference in its entirety for all purposes as if fully set forth herein.

FIELD OF THE DISCLOSURE

The disclosure relates to an integrated charger. Additionally, the disclosure relates to an integrated charger process.

BACKGROUND OF THE DISCLOSURE

Aircraft and other aerospace applications typically benefit from one or more onboard battery systems to provide power for various components onboard the aircraft. The onboard battery systems can be charged by internal power sources through a battery charging mechanism. However, prior art battery charging mechanisms typically provide only a limited charging capacity and/or capability resulting in a lengthy charge time. This especially comes into play in aircraft operations that involve shorter flight/operational times. The shorter flight/operational times prevent the onboard battery systems from being fully charged by the internal power sources. Moreover, the shorter flight/operational times result in a higher frequency of onboard battery usage (e.g., engine starting). The combination of both result in reduced battery charging, higher battery power usage, and the like that result in an insufficient battery power. This can be detrimental to the operation of the aircraft that results in delays, possible downtime, safety issues, and the like.

Accordingly, additional battery charging capability as well as a charging system and associated process having a decreased charging time is needed.

SUMMARY OF THE DISCLOSURE

The foregoing needs are met, to a great extent, by the disclosure, wherein in one aspect a process and apparatus are provided for charging a battery through an integrated battery charging system.

In accordance with one aspect, an aircraft-based power system includes a charger system that includes a charger controller and a charger circuit; the charger system further configured to connect to a ground-based power source; the charger system further configured to deliver power from the ground-based power source to the charger circuit; the charger circuit configured to be controlled by the charger controller; the charger controller configured to control the charger circuit consistent with a charging protocol; and the charger system further configured to charge a battery system comprising a plurality of battery cells with the charger circuit consistent with the charging protocol.

In accordance with one aspect, an aircraft-based power system process includes implementing a charger system that includes a charger controller and a charger circuit; connecting the charger system to a ground-based power source; receiving power from the ground-based power source to the charger circuit; controlling with the charger circuit the charger controller; controlling the charger circuit consistent with a charging protocol; and charging a battery system comprising a plurality of battery cells with the charger circuit consistent with the charging protocol.

There has thus been outlined, rather broadly, certain aspects of the disclosure in order that the detailed description thereof herein may be better understood, and in order that the present contribution to the art may be better appreciated. There are, of course, additional aspects of the disclosure that will be described below and which will form the subject matter of the claims appended hereto.

In this respect, before explaining at least one aspect of the disclosure in detail, it is to be understood that the disclosure is not limited in its application to the details of construction and to the arrangements of the components set forth in the following description or illustrated in the drawings. The disclosure is capable of aspects in addition to those described and of being practiced and carried out in various ways. Also, it is to be understood that the phraseology and terminology employed herein, as well as the abstract, are for the purpose of description and should not be regarded as limiting.

As such, those skilled in the art will appreciate that the conception upon which this disclosure is based may readily be utilized as a basis for the designing of other structures, methods, and systems for carrying out the several purposes of the disclosure. It is important, therefore, that the claims be regarded as including such equivalent constructions insofar as they do not depart from the spirit and scope of the disclosure.

DETAILED DESCRIPTION

The disclosure will now be described with reference to the drawing Figures, in which like reference numerals refer to like parts throughout. Aspects of the disclosure advantageously provide an integrated charging system and associated process having decreased charging time.

Figure 1:
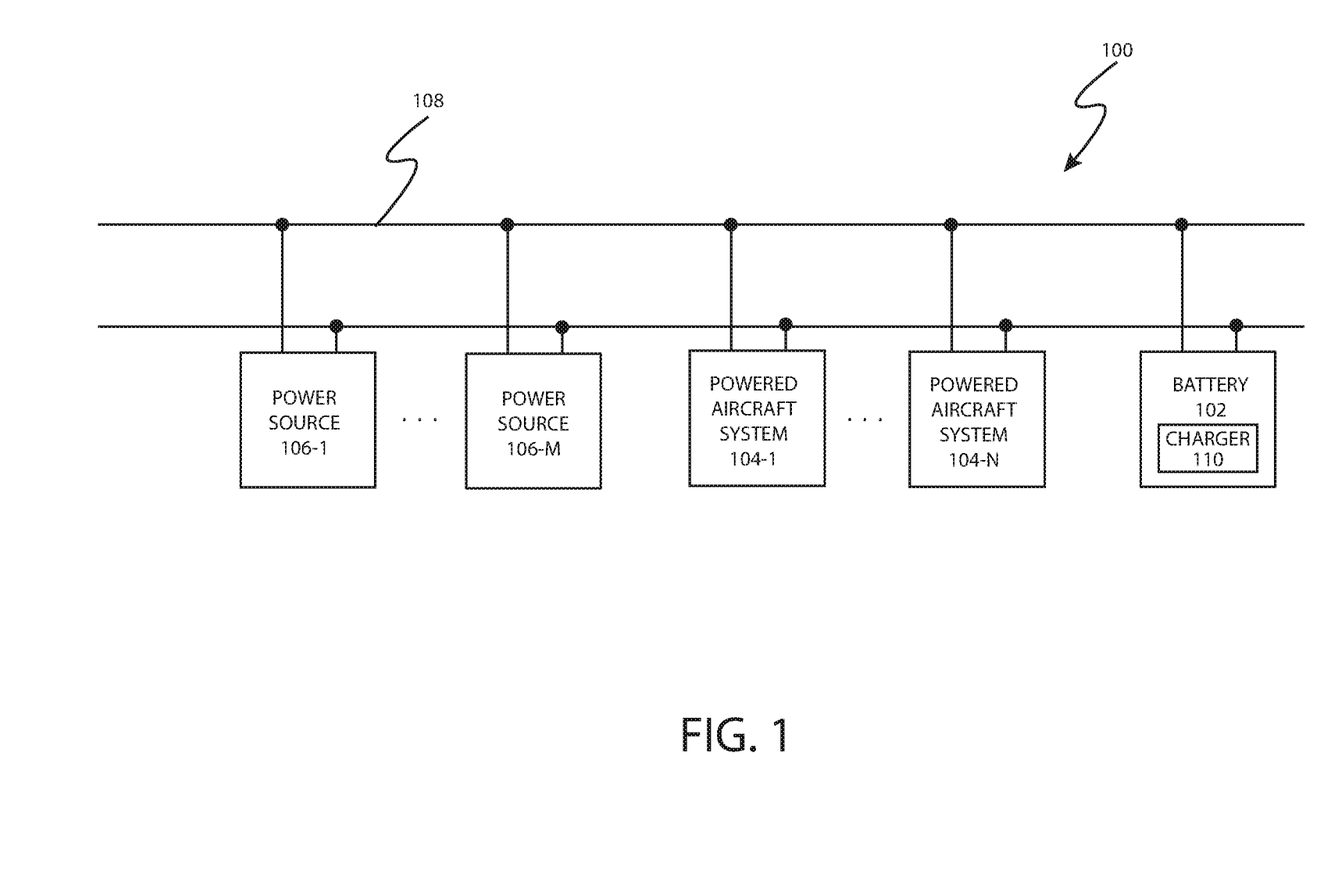
FIG. 1 illustrates an exemplary electrical power system for an aerospace application in accordance with aspects of the disclosure.

FIG. 1 illustrates an exemplary electrical power system for an aerospace application in accordance with aspects of the disclosure.

In particular, FIG. 1 illustrates an aircraft power system 100. For simplicity and the brevity of the disclosure, the exemplary aircraft power system 100 is illustrated with a high level of simplification. Moreover, although reference is made to an implementation in aircraft or other aerospace applications, the disclosure is equally applicable to implementations in other types of vehicles as well as other systems benefiting from supplemental charging, integrated charging, accelerated charging of associated battery systems, and the like. For brevity of disclosure, reference will be generally made to aircraft in the disclosure.

The aircraft power system 100 may include an aircraft power bus 108. The aircraft power bus 108 may include at least two power lines providing positive and negative voltage potential. The aircraft power bus 108 may extend along at least a portion of the aircraft internally connecting to various aircraft systems. For example, the aircraft power bus 108 may connect to powered aircraft systems 104-1 through powered aircraft systems 104-N, where N is a positive integer. The powered aircraft systems 104 may include flight control systems, landing gear systems, electrical systems, bleed systems, hydraulic systems, avionics systems, supplemental oxygen systems, fuel systems, power plant systems, navigation systems, communication systems, ice protection systems (anti-icing and deicing), environmental control systems, instrumentation and recording systems, vacuum systems, fire protection systems, safety systems, and the like. Each of the powered aircraft systems 104 may need electrical power for operation of one or more aspects thereof. Accordingly, the powered aircraft systems 104 may connect to the aircraft power bus 108 to receive power. For example, in one aspect the powered aircraft system 104 may include an auxiliary power unit that requires power for starting. As another example, in one aspect the powered aircraft system 104 may include a turbine unit that requires power for starting.

The aircraft power system 100 may further include at least one power source system 106 (power source system 106-1 through power source system 106-M, wherein M is a positive integer). The power source system 106 may be a generator associated with the auxiliary power unit, a generator associated with the turbine, and the like. When operational, the power source system 106 provides power to the aircraft power bus 108 for operation of the powered aircraft systems 104. Additionally, the powered aircraft systems 104 may provide charging power to a battery system 102. On the other hand, when the power source system 106 is not operational or is providing insufficient power to the aircraft power bus 108, the battery system 102 may provide power to the aircraft power bus 108. In one aspect, the aircraft power bus 108 may be configured for operation at or about 28 V DC and rated for 700 amps. In one aspect, the aircraft power bus 108 may be configured for operation at 12-16 V DC, 16-20 V DC, 20-24 V DC, 24-30 V DC, 30-40 V DC, or 40-60 V DC. In one aspect, the aircraft power bus 108 may be rated for an operational current of 100 amps to 300 amps, 300 amps to 500 amps, 500 amps to 800 amps, or 800 amps to 1100 amps. Other voltages and currents are contemplated as well for the aircraft power bus 108.

Additionally according to the disclosure, the battery system 102 may include a charging system 110. As further detailed below, the charging system 110 is configured to provide for integrated charging of the battery system 102.

Figure 2:
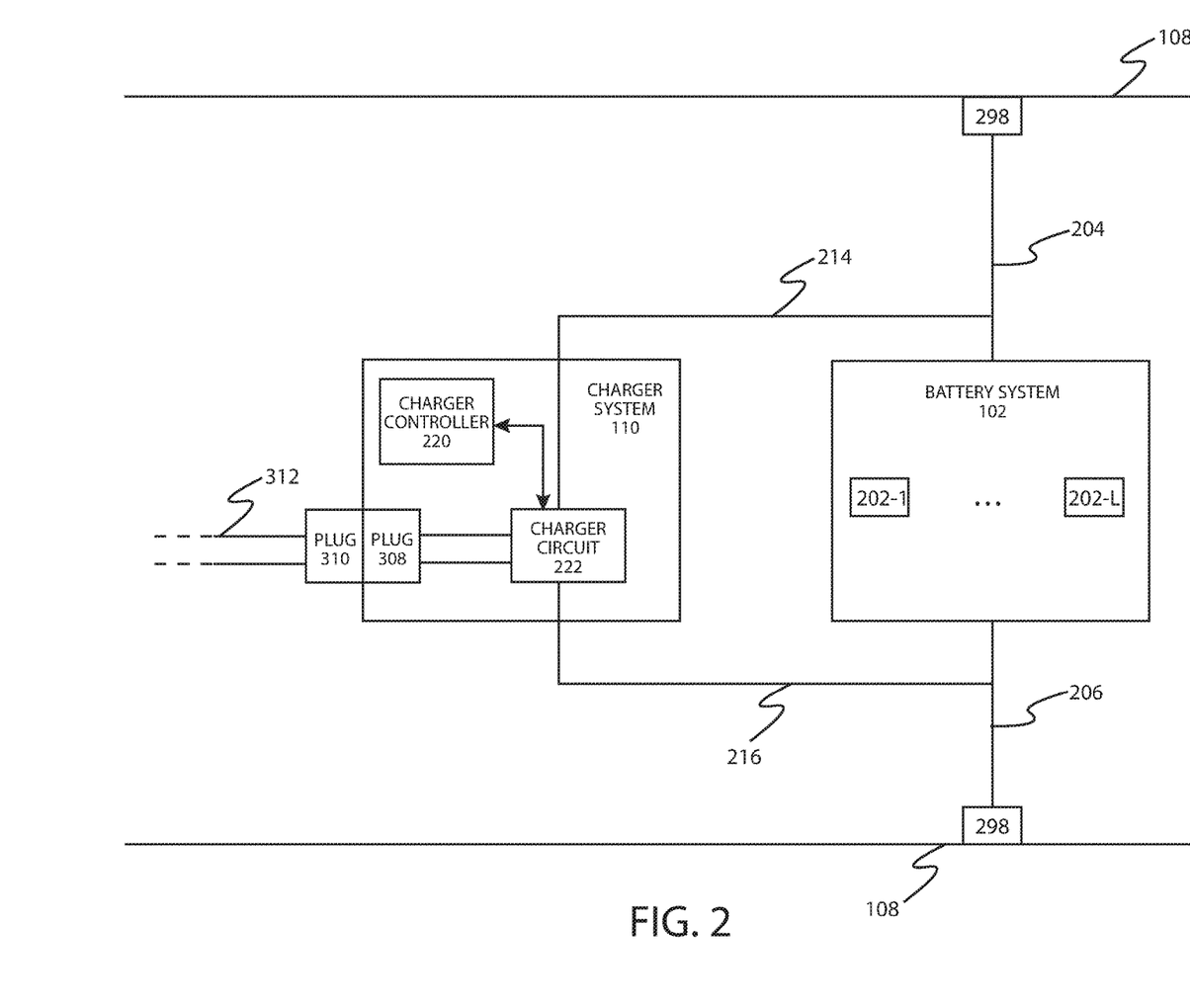
FIG. 2 illustrates a schematic of a battery system and charger system for an aerospace application in accordance with aspects of the disclosure.

FIG. 2 illustrates a schematic of a battery system and charger system for an aerospace application in accordance with aspects of the disclosure.

In particular, FIG. 2 illustrates the details of the charging system 110 and the battery system 102. The battery system 102 may utilize any type of battery technology. The battery technology implemented by the battery system 102 may include one or more of an Aluminum-ion battery, Lead-acid battery, Lithium-ion battery, Magnesium-ion battery, Molten salt battery, Nickel-cadmium battery, Nickel metal hydride battery, Nickel-zinc battery, Polymer-based battery, any other secondary/rechargeable battery chemistry, and/or the like.

Additionally, the battery system 102 may include a plurality of battery cells 202 or separate battery structures (battery cells 202-1 through battery cells 202-L, wherein L is a positive integer). The plurality of battery cells 202 may be connected in series to provide an increased voltage level. In one aspect, there may be 19 battery cells 202. In one aspect, there may be 12-14 battery cells 202, 14-16 battery cells 202, 16-18 battery cells 202, 18-20 battery cells 202, or 20-24 battery cells 202. Furthermore, the battery system 102 may include a standardized plug 298 to connect the battery system 102 to the aircraft power bus 108. In one aspect, there may be two of the standardized plugs 298 (as illustrated in FIG. 2). One of the standardized plugs 298 for connecting to the aircraft power bus 108 for positive voltage; and one of the standardized plugs 298 for connecting to the aircraft power bus 108 for negative voltage. In another aspect, there may be a single standardized plug 298 for connecting to the aircraft power bus 108 for positive voltage and negative voltage. The battery system 102 may further include a positive line 204 connecting the battery system 102 through the standardized plug 298 to the aircraft power bus 108. The battery system may further include a negative line 206 to connect the battery system 102 through the standardized plug 298 to the aircraft power bus 108. In one aspect, the standardized plug 298 may be an Elon type connector.

In one aspect, there may be 10 battery cells 202. In one aspect, there may be 12 battery cells 202. In one aspect, there may be 14 battery cells 202. In one aspect, there may be 16 battery cells 202. In one aspect, there may be 18 battery cells 202. In one aspect, there may be 20 battery cells 202. In one aspect, there may be 22 battery cells 202. In one aspect, there may be 24 battery cells 202. In one aspect, there may be 26 battery cells 202. In one aspect, there may be any number of battery cells 202.

In one aspect, the battery cells 202 are connected in series such that a first battery cell (202-1) of the battery cells 202 is connected to a first line of the aircraft power bus 108 and the last battery cell (202-L) of the battery cells 202 is connected to a second line of the aircraft power bus 108. Accordingly, in one aspect, the battery cells 202 may receive power from the aircraft power bus 108 for charging; and in another aspect, the battery cells 202 may provide power to the aircraft power bus 108 for powering the powered aircraft systems 104.

FIG. 2 further illustrates the charging system 110. In one aspect, the charging system 110 may be integrated into the battery system 102 (see FIGS. 5 and 6). In another aspect, the charging system 110 may be separately implemented with the battery system 102 (see FIG. 7). Moreover, the charging system 110 may include a connection to the battery system 102 to deliver power to the battery system 102 in accordance with a charging protocol. In one aspect, the charging system 110 may include a connection 214 to the positive line 204 as well as a connection 216 to the negative line 206 to provide power (one or more voltages and one or more currents) to the battery system 102 in accordance with the charging protocol.

The charging system 110 may include a plug 308. The plug 308 may be implemented as a male or female type configuration. The plug 308 is configured to receive a corresponding plug 310 that is connected to a ground-based power source. The corresponding plug 310 may be implemented as a male or female type configuration. In one aspect, the plug 308 is a male configuration and the corresponding plug 310 has a corresponding female type configuration. The plug 310 may be connected to the ground-based power source via a cable 312. The cable 312 may include appropriately sized gauge wires to deliver a positive voltage potential and a negative voltage potential from the ground-based power source to the plug 308. The cable 312 may further include a ground wire as well to provide grounding to the charging system 110. In one aspect, the plug 308/310 may be implemented as a J2 plug. In one aspect, the plug 308/310 may be implemented as a J3 plug. In one aspect, the plug 308/310 may be implemented as a J2 Circular MIL Spec Connector. In one aspect, the plug 308/310 may be implemented as a J3 Circular MIL Spec Connector.

The ground-based power source may be an alternating current (AC) mains supply of electricity, a ground-based generator power source providing an alternating current (AC) supply of electricity, or the like. In one aspect, the ground-based power source provides 120 V AC at 60 Hz. In one aspect, the ground-based power source provides 230 V AC at 50 Hz. In other aspects, the ground-based power source may provide any voltage at any frequency. Moreover, the ground based power source may provide a three-phase or a polyphase alternating current (AC) supply of electricity through additional wires.

The charging system 110 may be further configured to receive the power from the ground-based power supply and convert it to the appropriate direct current voltage and control the current according to the charging protocol. The converted power is then delivered to the battery system 102 for charging the battery cells 202. In one aspect, the converted power is delivered through the line 214 to the line 204 as well as delivered to the line 216 and the line 206 for charging the battery system 102.

Figure 4:
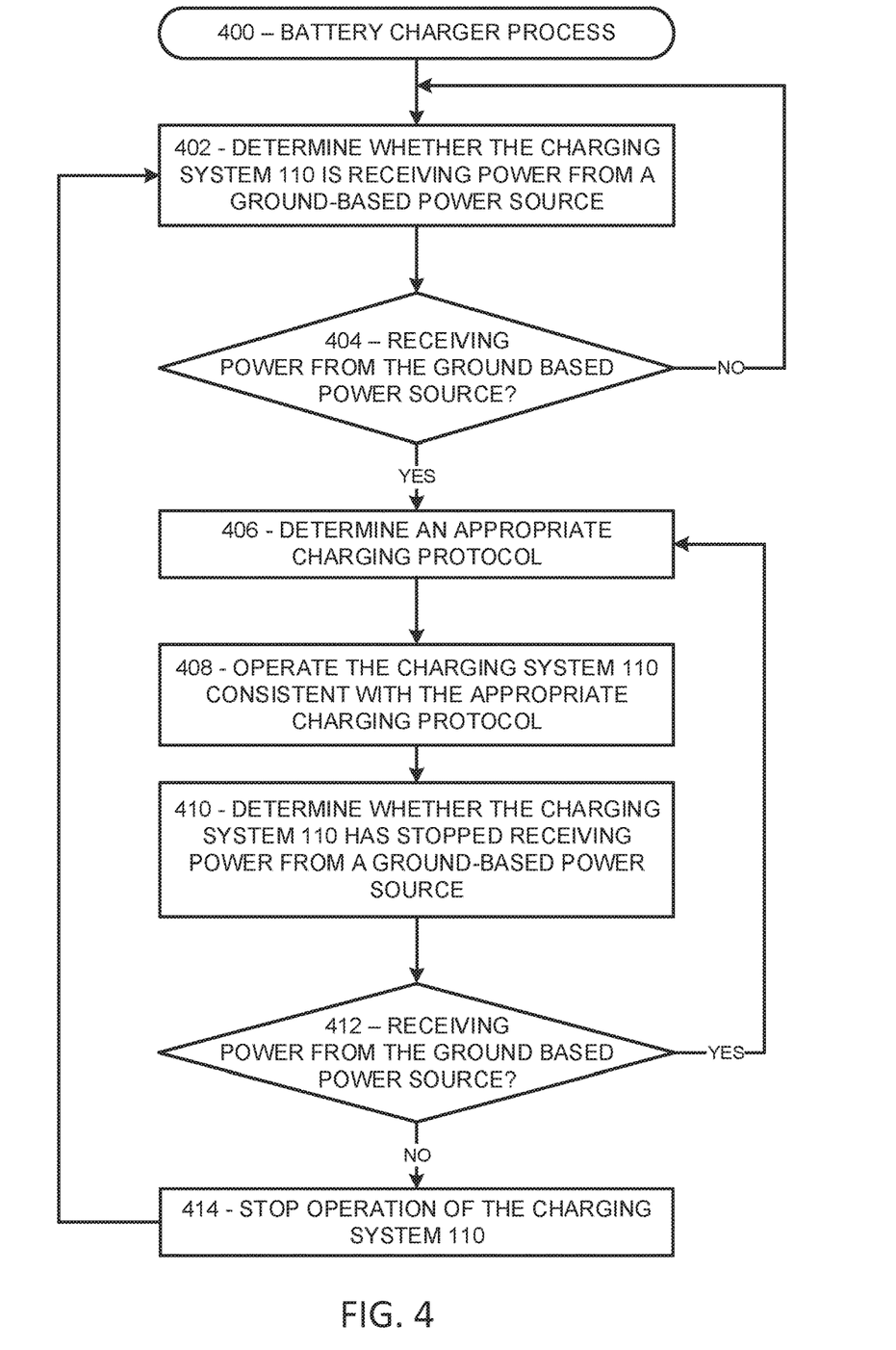
FIG. 4 illustrates a process of operating a battery system and charger system for an aerospace application in accordance with aspects of the disclosure.

The charging system 110 may include a charger controller 220. The charger controller 220 may include a processor and may be implemented as a computer system that may include a memory, a display, a transceiver, a user interface, and the like. The processor may be configured to process functions, provide other services, and the like. The computer system may further include a user interface, an input/output device, a computer readable medium, and a power supply. Additionally, the computer system may implement an operating system, a touchscreen controller, a communications component, a graphics component, a contact/motion component, and the like to provide full functionality. In particular, the processor may be configured to execute a software application configured to control the charging system 110 to charge the battery system 102 with a desired charging protocol. In one aspect, the software application may be configured to interact with sensors, aircraft systems, and the like for a determination of a desired charging protocol. In one aspect, the software application may implement the process 400 described below.

The processor may further include one or more sensors to sense a condition of the battery system 102, the charging system 110, an aircraft system, a power source system 106, a powered aircraft system 104, a ground-based power supply, or the like. In particular, the one or more sensors may provide signals to the processor in order to change the charging protocol. The one or more sensors may include a current sensor, a voltage sensor, temperature sensor, and the like.

The charger controller 220 may further control a charger circuit 222 implemented by the charging system 110. The charger circuit 222 may include one or more of a rectifier, DC to DC converter, transformer, voltage regulator, fuses, ground fault circuit interrupter, temperature sensing circuits, voltage sensing circuits, and/or the like.

The charger circuit 222 may include a rectifier. The rectifier may be configured to convert alternating current (AC) to direct current (DC) as needed within the charging system 110.

The charger circuit 222 may include a DC to DC converter. The DC to DC converter converts a source of direct current (DC) from one voltage level to another as needed within the charging system 110.

The charger circuit 222 may include a transformer. The transformer may be configured to step up or step down the alternating current (AC) as needed within the charging system 110.

The charger circuit 222 may include a voltage regulator. The voltage regulator may be configured to provide a stable DC voltage independent of the load current, temperature, and AC power source variations as needed within the charging system 110.

The charger circuit 222 may include one or more fuses. The one or more fuses may be configured to protect against excessive current as needed within the charging system 110.

The charger circuit 222 may include a ground fault circuit interrupter (GFCI). The ground fault circuit interrupter (GFCI) may be configured to break an electric circuit to prevent serious harm from an ongoing electric shock as needed within the charging system 110.

The charging system 110 may implement a charging protocol. The charging protocol may determine particular voltage levels, current amounts, time periods, and the like for the delivery of power to the battery system 102. Thereafter, the charger circuit 222 may be controlled consistent with the charging protocol to deliver the particular voltage levels, current amounts, and the like during various time periods to the battery system 102.

The charging system 110 may be configured to utilize outputs from the temperature or voltage sensing circuits monitored by the charger controller 220 to safely adjust the charging current and voltage, determine the state of charge, and determine an end of charge.

The charging system 110 may be further configured to implement a trickle charger protocol. The trickle charger protocol may provide a relatively small amount of current, only enough to counteract self-discharge of a battery that is idle for a long time.

The charging system 110 may also implement active monitoring of the battery to protect it from overcharging.

In one aspect, the charging system 110 may include a charging protocol to supply a constant DC or pulsed DC power source to the battery system 102.

In one aspect, the charging system 110 may include a fast charging protocol controlled by the charger controller 220 to rapidly charge the battery system 102 at a higher voltage. In one aspect, the charging system 110 may include a fast charging protocol controlled by the charger controller 220 to rapidly charge the battery system 102 without damaging any of the battery cells 202 in the battery system 102. The charging system 110 may include a cooling fan to reduce the temperature of the battery cells 202 to safe levels.

The charger controller 220 may implement a charging protocol to accelerate the charging time and provide continuous charging that may detect the state of the battery cells 202 and may apply a multi-stage charging scheme. The first stage may be a "bulk absorption" stage and the charging current may be held high and constant. A second stage may include a stage where the voltage is held constant. As the current declines at the maintained voltage, the charger controller 220 implements a third stage and the charger output is held at a constant voltage.

The charger controller 220 may be configured to implement a charging protocol utilizing pulse technology in which a series of voltage or current pulses is fed to the battery cells 202. The DC pulses may have a strictly controlled rise time, pulse width, pulse repetition rate (frequency), and amplitude.

The charger controller 220 may be configured to implement a protocol with programmed complex charging cycles specified by battery type.

The charger controller 220 may be configured to implement various safety protections. The safety protections implemented by the charger controller 220 may include over voltage protection, over charge protections, over current protections, over heat protections, short-circuit protections, over discharge protections, and like.

In one aspect, the charging system 110 may operate in response to an aircraft system. The aircraft system may be a central maintenance system (CMS), a flight management system (FMS), a flight warning system (FWS), a cabin management system, or the like. The aircraft system may be configured to ascertain a need for operating the charging system 110 in a particular charging protocol and control the charging system 110 accordingly.

In one aspect, a processor may be configured to ascertain a need for operating the charging system 110 in a particular charging protocol and control the charging system 110 to implement that charging protocol. The processor may be implemented in the charging system 110, in the aircraft, an aircraft system, or the like.

The charging system 110 and/or the processor may include Built-in test equipment (BITE). The Built-in test equipment (BITE) may be configured to address fault management and include diagnostic equipment built into airborne systems to support maintenance processes. The Built-in test equipment (BITE) may include sensors, multimeters, oscilloscopes, discharge probes, frequency generators, and the like to enable testing and perform diagnostics. The Built-in test equipment (BITE) may include the detection of the fault, the accommodation of the fault (how the system actively responds to the fault), the annunciation or logging of the fault to warn of possible effects and/or aid in troubleshooting the faulty equipment, or the like.

Figure 3:
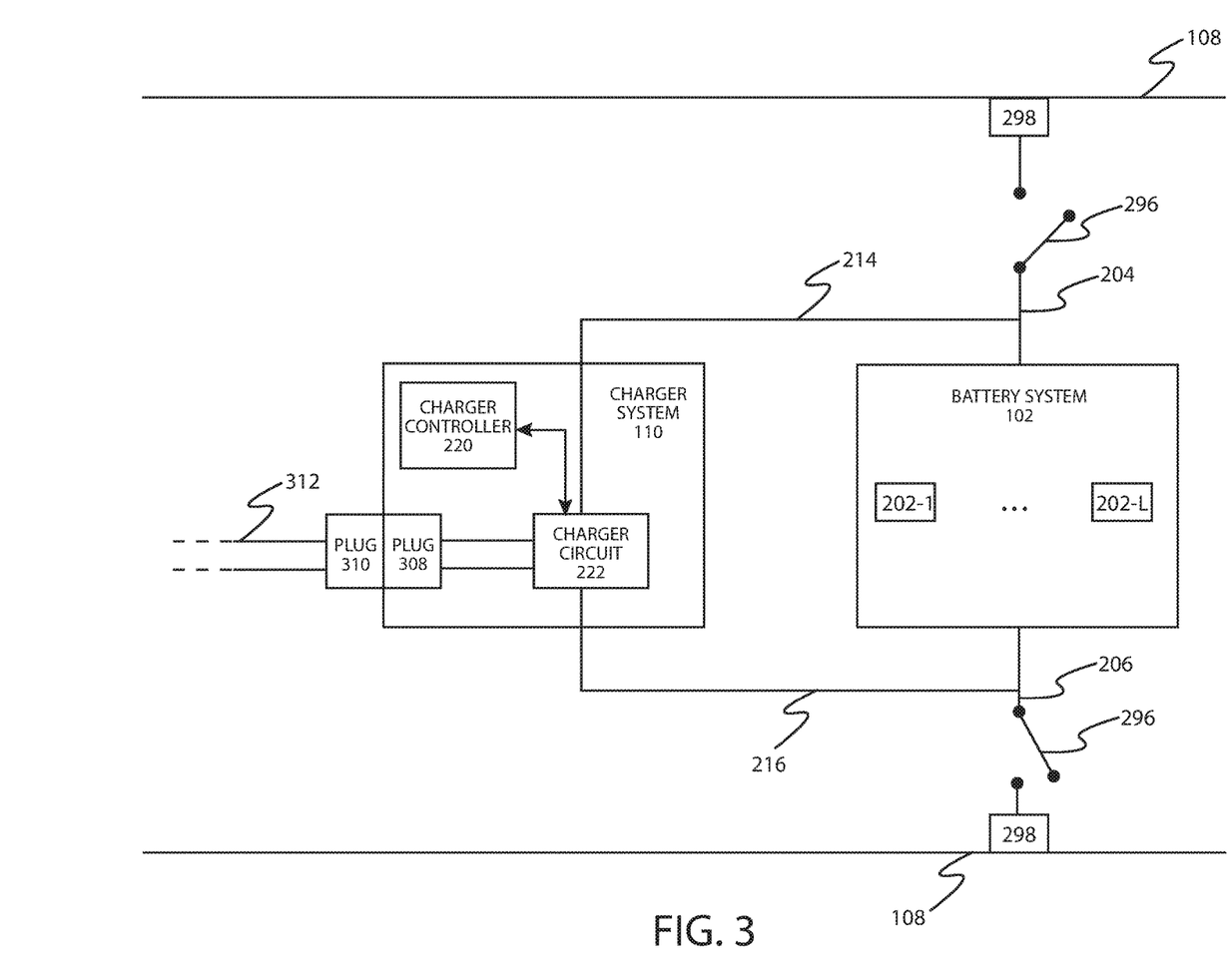
FIG. 3 illustrates a schematic of another battery system and charger system for an aerospace application in accordance with aspects of the disclosure.

FIG. 3 illustrates a schematic of another battery system and charger system for an aerospace application in accordance with aspects of the disclosure.

In particular, FIG. 3 illustrates the charging system 110 and battery system 102 that includes generally all the same features and components. FIG. 3 further illustrates that one or more switches may be implemented to disconnect the battery system 102 from the aircraft power bus 108 when the charging system 110 is operating. In this regard, the battery system 102 may be connected to the aircraft power bus 108 by one or more switches 296. Closing the one or more switches 296 allows the battery system 102 to provide power to the aircraft power bus 108 or receive power from aircraft power bus 108. Opening the one or more switches 296 isolates the battery system 102 from the aircraft power bus 108 and allows the charging system 110 to charge the battery system 102.

The switch 296 may be implemented using any known switching technology. In one aspect, the switch 296 may be a relay. In one aspect, the relay may include a coil of wire wrapped around a soft iron core (a solenoid), an iron yoke, which provides a low reluctance path for magnetic flux, a movable iron armature, and one or more sets of contacts. Other configurations of the relay are contemplated as well. The relay may be implemented as a coaxial relay, contactor, force guided contacts relay, latching relay, machine tool relay, or the like. In one aspect, the switch may be solid-state relays. The solid-state relays may use power semiconductor devices such as thyristors, transistors, or the like to switch currents. The transistors may include any type of transistor technology including a Bipolar junction transistor (BJT), a Field-effect transistor (FET), a junction gate field-effect transistor (JFET), a metal-oxide-semiconductor field-effect transistor (MOSFET), or the like. In one aspect, the switch 296 may be implemented as a power module.

The switch 296 may be controlled manually, automatically, or the like. In one aspect, the control of the switch 296 may be in response to an aircraft system as described herein.

FIG. 4 illustrates a process of operating a battery system and charger system for an aerospace application in accordance with aspects of the disclosure.

In particular, FIG. 4 illustrates a battery charger process 400. The battery charger process 400 may be implemented by the processor, the charging system 110, the battery system 102, the aircraft, the aircraft system, or the like.

In box 402, the process 400 may sense whether the charging system 110 is receiving power from a ground-based power source. The sensing may be initiated by the processor, the one or more sensors associated with the processor, the charging system 110, the battery system 102, the aircraft, the aircraft system, or the like.

In box 404, the process 400 may determine whether the charging system 110 is receiving power from the ground based power source. Thereafter, if yes the process will advance to box 406. Otherwise, the process 400 may loop until a determination is made regarding receiving power from the ground based power source.

In box 406, the process 400 may determine an appropriate charging protocol for charging the battery system 102. The determination may be from the processor, the one or more sensors associated with the processor, the charging system 110, the battery system 102, the aircraft, the aircraft system, or the like. Additionally, the switches 296 may be opened if implemented consistent with the FIG. 3 aspect.

In box 408, the process 400 may operate the charging system 110 consistent with the appropriate charging protocol.

In box 410, the process 400 may determine whether the charging system 110 has stopped receiving power from a ground-based power source. If so, the process in box 412 advances to box 414. Otherwise, the process 400 will loop until the charging system 110 determines it has stopped receiving power from a ground-based power source.

In box 414, the process 400 may stop operation of the charging system 110. Additionally, the process 400 may thereafter close switches 296 if implemented consistent with the FIG. 3 aspect.

Figure 5:
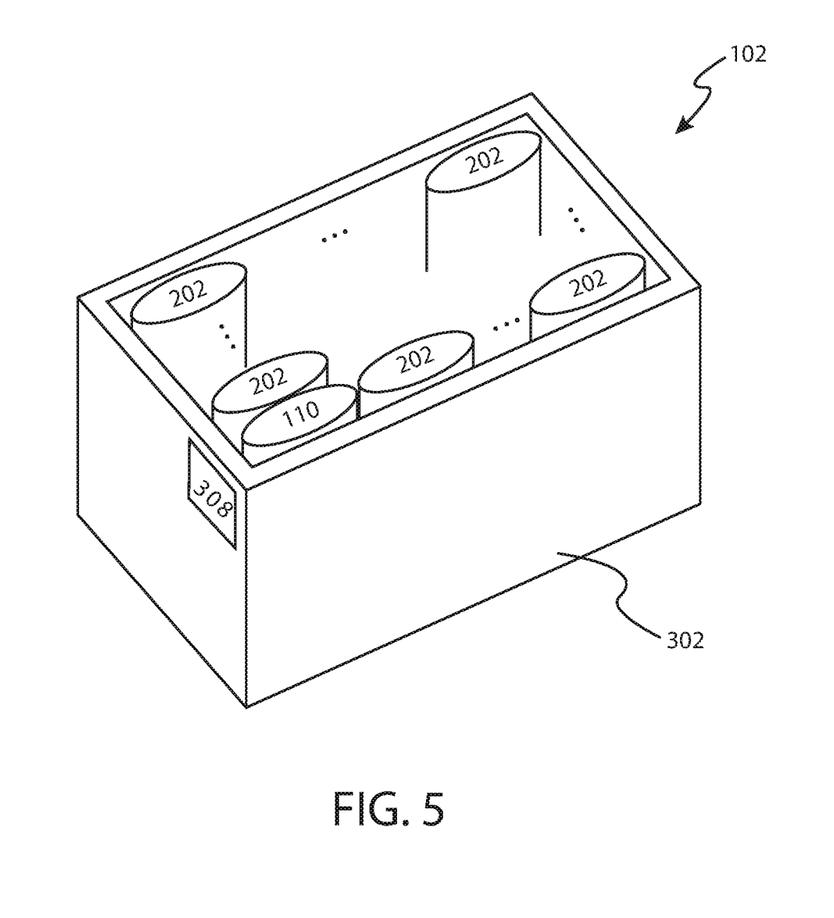
FIG. 5 illustrates a form factor and structural arrangement of the battery system and charger system for an aerospace application in accordance with aspects of the disclosure.

FIG. 5 illustrates a form factor and structural arrangement of the battery system and charger system for an aerospace application in accordance with aspects of the disclosure.

In particular, FIG. 5 illustrates a perspective view of the battery system 102 that includes schematically a plurality of battery cells 202. The plurality of battery cells 202 may be arranged in a housing 302. In some implementations, the battery system 102 may include a dummy battery cell, which may be removed and the charging system 110 structured and arranged in place of the dummy battery cell as illustrated in FIG. 5.

In the FIG. 5 configuration, the plug 308 for supplying power to the charging system 110 may be arranged on the housing 302 such that maintenance workers can easily connect the charging system 110 to the ground-based power source.

The housing 302 may further include rigid walls and a floor to hold the battery cells 202 as well as the charging system 110. Various components within the housing 302 and the associated connections may be hermetically sealed. The housing 302 may further include various waterproofing technologies, insulation, cooling vents, and the like. The housing 302 may further include a cover that fully encloses the housing 302.

Figure 6:
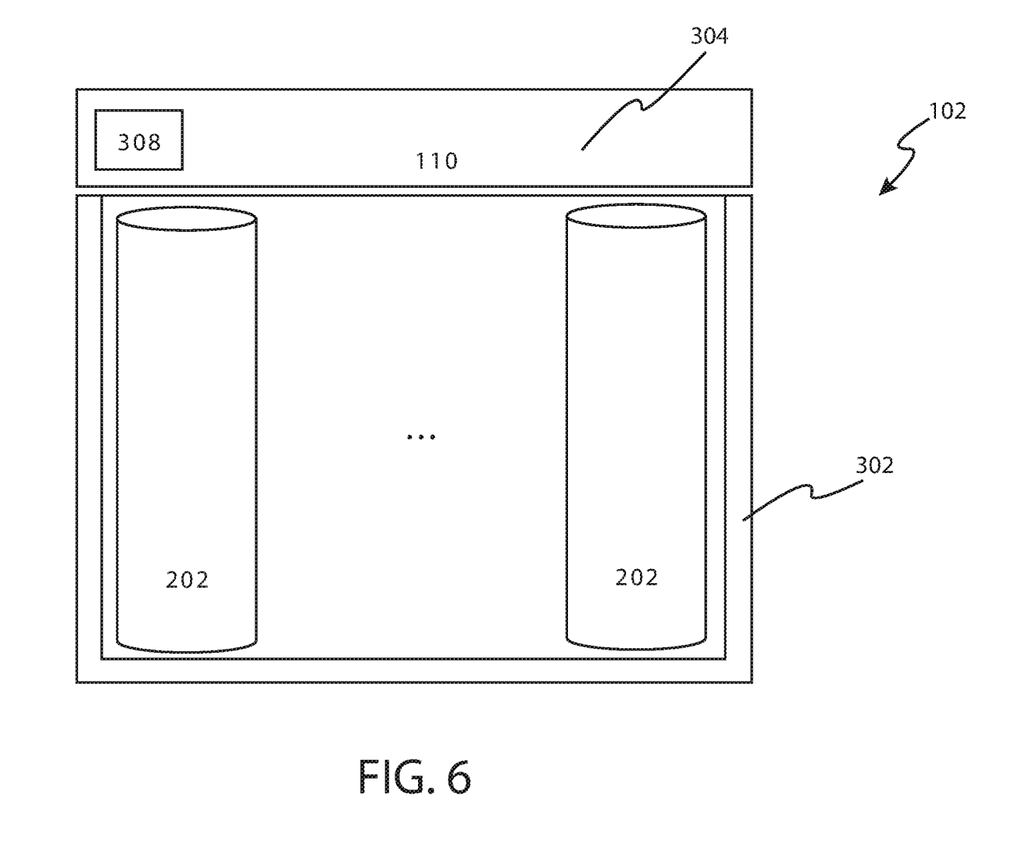
FIG. 6 illustrates a cross-sectional side view of a form factor and structural arrangement of the battery system and charger system for an aerospace application in accordance with aspects of the disclosure.

FIG. 6 illustrates a cross-sectional side view of a form factor and structural arrangement of the battery system and charger system for an aerospace application in accordance with aspects of the disclosure.

In particular, FIG. 6 illustrates a cross-sectional side view the battery system 102 that includes a plurality of battery cells 202. The plurality of battery cells 202 may be arranged in a housing 302. In some implementations, the battery system 102 may include a cover 304 and the charging system 110 may be structured and arranged in the cover 304 as illustrated in FIG. 6. In other implementations, the charging system 110 may be structured and arranged in the walls, floor, or the like of the housing 302.

In the FIG. 6 configuration, the plug 308 for supplying power to the charging system 110 may be arranged on the cover 304 such that maintenance workers can easily connect the charging system 110 to the ground-based power source.

Figure 7:
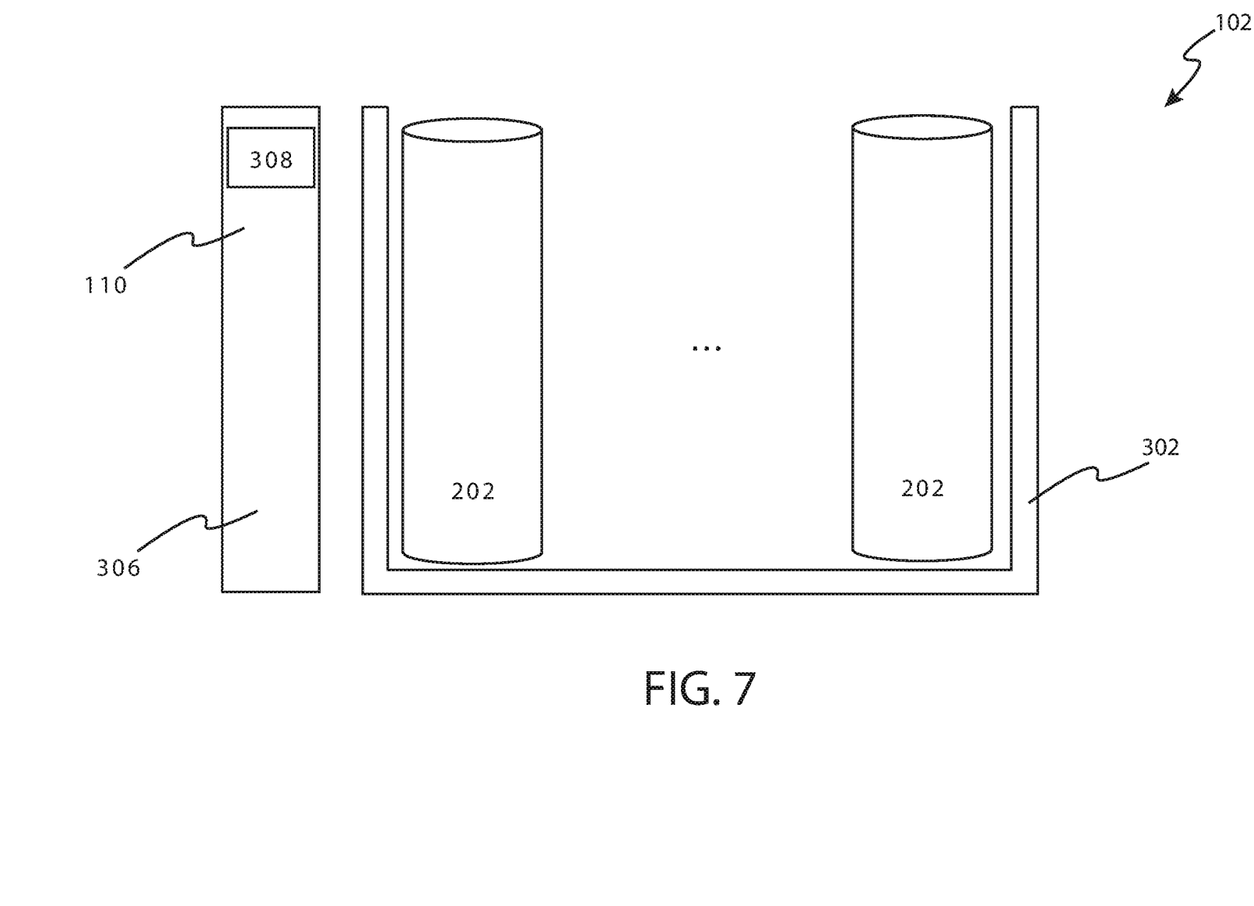
FIG. 7 illustrates a cross-sectional side view of a form factor and structural arrangement of the battery system and charger system for an aerospace application in accordance with aspects of the disclosure.

FIG. 7 illustrates a cross-sectional side view of a form factor and structural arrangement of the battery system and charger system for an aerospace application in accordance with aspects of the disclosure.

In particular, FIG. 7 illustrates a cross-sectional side view the battery system 102 that includes schematically a plurality of battery cells 202. The plurality of battery cells 202 may be arranged in a housing 302. In some implementations, the charging system 110 may be structured and arranged in a separate housing 306 as illustrated in FIG. 7.

In the FIG. 7 configuration, the plug 308 for supplying power to the charging system 110 may be arranged on the separate housing 306 such that maintenance workers can easily connect the charging system 110 to the ground-based power source.

The housing 306 may further include rigid walls and a floor to hold the charging system 110. Various components within the housing 306 and the associated connections may be hermetically sealed. The housing 360 may further include various waterproofing technologies, insulation, cooling vents, and the like. The housing 360 may further include a cover that fully encloses the housing 306.

In particular aspects, the disclosure is directed to a battery with an integral ground use only charger for an aerospace application. The battery may use a standard plug and/or adaptor interface to an external voltage source for the purpose of providing an off aircraft bus charging function when lower than full charge state when the aircraft is on the ground and not operational. When full, the charger shifts to a maintenance trickle mode. The battery connects to the main bus through the normal Elcon type or other connector. When the external voltage is connected, the main bus connection to the aircraft is broken. The charger is integrated with the battery and installs as a single unit. In one aspect, the charger is integrated into a dummy cell. This aspect works for a 19 cell battery. For a 20 cell battery, spacers and the case may be adjusted to be slightly larger. The case lid may be another possible option. In this regard, the case/can is still at the same environmental levels. The charging connector is hermetic to the case and installed either permanently or non-permanently.

Accordingly, the disclosure has set forth details of a charging system. The charging system taught by the disclosure has a decreased charging time. Moreover, numerous other beneficial features are set forth in the disclosure.

Further in accordance with various aspects of the disclosure, the methods described herein are intended for operation with dedicated hardware implementations including, but not limited to, PCs, PDAs, semiconductors, application specific integrated circuits (ASIC), programmable logic arrays, cloud computing devices, and other hardware devices constructed to implement the methods described herein.

It should also be noted that the software implementations of the disclosure as described herein are optionally stored on a tangible storage medium, such as: a magnetic medium such as a disk or tape; a magneto-optical or optical medium such as a disk; or a solid state medium such as a memory card or other package that houses one or more read-only (non-volatile) memories, random access memories, or other re-writable (volatile) memories. A digital file attachment to email or other self-contained information archive or set of archives is considered a distribution medium equivalent to a tangible storage medium. Accordingly, the disclosure is considered to include a tangible storage medium or distribution medium, as listed herein and including art-recognized equivalents and successor media, in which the software implementations herein are stored.

Additionally, the various aspects of the disclosure may be implemented in a non-generic computer implementation. Moreover, the various aspects of the disclosure set forth herein improve the functioning of the system as is apparent from the disclosure hereof. Furthermore, the various aspects of the disclosure involve computer hardware that it specifically programmed to solve the complex problem addressed by the disclosure. Accordingly, the various aspects of the disclosure improve the functioning of the system overall in its specific implementation to perform the process set forth by the disclosure and as defined by the claims.

The many features and advantages of the disclosure are apparent from the detailed specification, and, thus, it is intended by the appended claims to cover all such features and advantages of the disclosure, which fall within the true spirit, and scope of the disclosure. Further, since numerous modifications and variations will readily occur to those skilled in the art, it is not desired to limit the disclosure to the exact construction and operation illustrated and described, and, accordingly, all suitable modifications and equivalents may be resorted to that fall within the scope of the disclosure.

What is claimed is:

1. An aircraft-based power system comprising:
   a charger system that comprises a charger controller and a charger circuit;
   the charger system further configured to connect to a ground-based power source;

the charger system further configured to determine the charger system is receiving power from the ground-based power source and deliver power from the ground-based power source to the charger circuit;

the charger circuit configured to be controlled by the charger controller;

the charger controller configured to control the charger circuit consistent with a charging protocol, wherein the charging protocol stipulates particular voltage levels and current amounts during one or more charging time periods; and the charger system further configured to charge a battery system comprising a plurality of battery cells with the charger circuit consistent with the charging protocol.

2. The aircraft-based power system of claim 1, further comprising at least one switch arranged on a circuit between the battery system and an aircraft bus, wherein the at least one switch is configured to open and isolate the battery system from the aircraft bus to charge the battery system with the power from the ground-based power source, wherein the charger system further is configured to determine the charger system has stopped receiving power from the ground-based power source and thereafter closes the at least one switch.

3. The aircraft-based power system of claim 1, further comprising a battery housing configured to store the battery system, wherein the charger system is arranged in the battery housing; and wherein the charger system further is configured to determine the charger system has stopped receiving power from the ground-based power source and thereafter stops operation of the charger circuit.

4. The aircraft-based power system of claim 3, further comprising a plug receptacle configured to receive a corresponding plug from the ground-based power source, wherein the plug receptacle is arranged on the battery housing; and wherein the plug receptacle is configured to receive the power from the ground-based power source to charge the battery system.

5. The aircraft-based power system of claim 1, further comprising:

one or more sensors to sense a condition of at least one of the following: the battery system, the charging system, an aircraft system, a power source system, a powered aircraft system, and the ground-based power source;

the one or more sensors are configured to provide signals to the charger controller in order to change the charging protocol;

the one or more sensors include at least one of the following: a current sensor, a voltage sensor, and temperature sensor;

a battery housing configured to store the battery system; and a battery housing cover configured to cover the battery housing, wherein the charger system is arranged in the battery housing cover.

6. The aircraft-based power system of claim 5, further comprising a plug receptacle configured to receive a corresponding plug from the ground-based power source, wherein the plug receptacle is arranged on the battery housing cover; and wherein the one or more sensors are configured to determine the charger system is receiving power from the ground-based power source.

7. The aircraft-based power system of claim 1, further comprising:

one or more sensors to sense a condition of the battery system;

the one or more sensors are configured to provide signals to the charger controller in order to change the charging protocol;

a battery housing configured to store the battery system; and a charger system housing configured to store the charger system, wherein the charger system housing is arranged adjacent to the battery housing.

8. The aircraft-based power system of claim 7, further comprising a plug receptacle configured to receive a corresponding plug from the ground-based power source, wherein the plug receptacle is arranged on the charger system housing; and wherein the one or more sensors are configured to sense the ground-based power supply and determine the charger system is receiving power from the ground-based power source.

9. The aircraft-based power system of claim 1, wherein:

the battery system is configured to be connected to an aircraft power bus when the ground-based power source has stopped providing power; and the battery system is configured to be isolated from the aircraft bus to charge the battery system when receiving power from the ground-based power source.

10. The aircraft-based power system of claim 1, wherein the charging protocol comprises a plurality of charging protocols;

wherein the plurality of charging protocols comprise at least a fast charging protocol and a trickle charge charging protocol; and wherein one or more sensors are configured to sense a condition of the battery system in order to change the charging protocol.

11. An aircraft-based power system process comprising:

implementing a charger system that comprises a charger controller and a charger circuit;

connecting the charger system to a ground-based power source;

receiving power from the ground-based power source to the charger circuit;

controlling with the charger circuit the charger controller;

controlling the charger circuit consistent with a charging protocol, wherein the charging protocol stipulates particular voltage levels and current amounts during one or more charging time periods; and charging a battery system comprising a plurality of battery cells with the charger circuit consistent with the charging protocol.

12. The aircraft-based power system process of claim 11, further comprising at least one switch arranged on a circuit between the battery system and an aircraft bus, wherein the at least one switch is configured to open and isolate the battery system from the aircraft bus to charge the battery system with the power from the ground-based power source, wherein the charger system further is configured to determine the charger system has stopped receiving power from the ground-based power source and thereafter closes the at least one switch.

13. The aircraft-based power system process of claim 11, further comprising a battery housing configured to store the battery system, wherein the charger system is arranged in the battery housing; and wherein the charger system further is configured to determine the charger system has stopped receiving power from the ground-based power source and thereafter stops operation of the charger circuit.

14. The aircraft-based power system process of claim 13, further comprising a plug receptacle configured to receive a corresponding plug from the ground-based power source,
wherein the plug receptacle is arranged on the battery housing; and
wherein the plug receptacle is configured to receive the power from the ground-based power source to charge the battery system.

15. The aircraft-based power system process of claim 11, further comprising:
one or more sensors to sense a condition of at least one of the following: the battery system, the charging system, an aircraft system, a power source system, a powered aircraft system, and the ground-based power source;
the one or more sensors are configured to provide signals to the charger controller in order to change the charging protocol;
the one or more sensors include at least one of the following: a current sensor, a voltage sensor, and temperature sensor;
a battery housing configured to store the battery system; and
a battery housing cover configured to cover the battery housing,
wherein the charger system is arranged in the battery housing cover.

16. The aircraft-based power system process of claim 15, further comprising a plug receptacle configured to receive a corresponding plug from the ground-based power source,
wherein the plug receptacle is arranged on the battery housing cover; and
wherein the one or more sensors are configured to determine the charger system is receiving power from the ground-based power source.

17. The aircraft-based power system process of claim 11, further comprising:
one or more sensors to sense a condition of the battery system;
the one or more sensors are configured to provide signals to the charger controller in order to change the charging protocol;
a battery housing configured to store the battery system; and
a charger system housing configured to store the charger system,
wherein the charger system housing is arranged adjacent to the battery housing.

18. The aircraft-based power system process of claim 17, further comprising a plug receptacle configured to receive a corresponding plug from the ground-based power source,
wherein the plug receptacle is arranged on the charger system housing; and
wherein the one or more sensors are configured to sense the ground-based power supply and determine the charger system is receiving power from the ground-based power source.

19. The aircraft-based power system process of claim 11, wherein the battery system is configured to be connected to an aircraft power bus when the ground-based power source has stopped providing power; and
the battery system is configured to be isolated from the aircraft bus to charge the battery system when receiving power from the ground-based power source.

20. The aircraft-based power system process of claim 11, wherein the charging protocol comprises a plurality of charging protocols; and
wherein the plurality of charging protocols comprise at least a fast charging protocol and a trickle charge charging protocol; and
wherein one or more sensors are configured to sense a condition of the battery system in order to change the charging protocol.

* * * * *